March 23, 1965     A. W. POMPER     3,174,302

GEAR COUPLING

Filed July 27, 1962     2 Sheets-Sheet 1

INVENTOR

BY ANTHONY W. POMPER

ATTORNEYS

March 23, 1965   A. W. POMPER   3,174,302
GEAR COUPLING

Filed July 27, 1962   2 Sheets-Sheet 2

INVENTOR

ANTHONY W. POMPER

BY *Thomas A. Mayner*

ATTORNEYS

United States Patent Office 3,174,302
Patented Mar. 23, 1965

3,174,302
GEAR COUPLING
Anthony W. Pomper, New Market, N.J., assignor to Midland-Ross Corporation, Cleveland, Ohio, a corporation of Ohio
Filed July 27, 1962, Ser. No. 212,817
3 Claims. (Cl. 64—9)

This invention relates to gear couplings and more particularly to floating sleeve type gear couplings where the sleeve and hubs have novel gear teeth that permit axial and angular readjustment of shaft end misalignment within certain limits.

Generally and irrespective of care in the mounting of aligned separated shafts, some misalignment will exist. Power is then transmitted through a coupling that joins the shaft ends. Various types of couplings are available and suggested and many of these, while usable, lack durability, ruggedness; give imperfect transmission of power and fail in prompt adjustment during rotation to displacement. Ease of readjustment to misalignment of a coupling increases friction between gear teeth with the possibility of tooth failure. This invention, through the study of the aforesaid matter, advantageously provides for a novel combination of sleeve and hub gear teeth, their shapes and sizes, in a coupling that is readily self-adjusting for increased efficiencies; that is capable of increased loading without fear of tooth failure; and one that is capable of longer wear. Increased gear tooth contact is provided as are larger teeth and reduced backlash, important factors for longer and efficient use.

The combination of a straight or flat sided sleeve tooth with a spherical involute hub tooth where the pitch diameters of the sleeve and of the gear hubs are the same or nearly so provides a coupling where the tooth contact point is on the pitch cylinder (sleeve) and remains close to the pitch sphere (hub) even during misalignment. This eliminates the very real possibility of tip loading of the teeth, thus reducing root stresses. Further, the absence of tip loading of the teeth eliminates "shaving" because of excessive metal to metal contact with resultant wearing between any two teeth in contact under misalignment.

The sleeve tooth is flat sided, it is of such size where the pressure angle is of between about 38° to about 42° and more specifically of about 40°, and the line of action of an applied force at the pitch line will intersect the hub root circle within the confines of the hub tooth. Also, the larger radius of the involute curvature, one that is flatter, reduces the compressive stresses at the point of contact between teeth. Furthermore, it has been found that the 40° pressure angle, while not being optimum for all sizes of couplings, appears to be the most advantageous compromise.

The described advantages of the coupling of this invention will be more apparent from the following more detailed description taken and the drawing, where:

Figure 3:
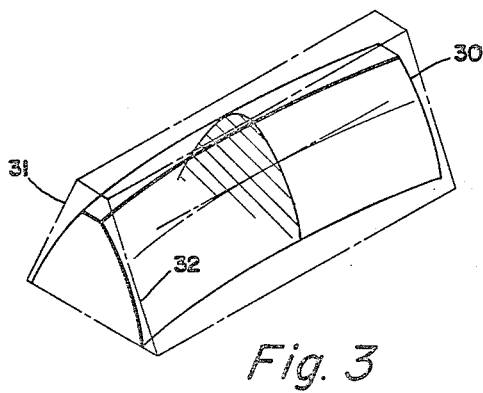
Figure 4:
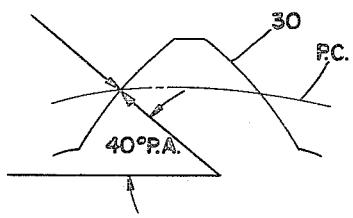
Figure 5:
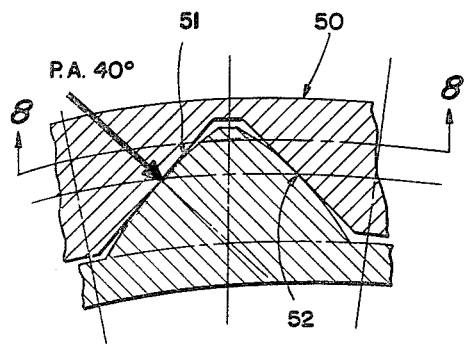
Figure 7:
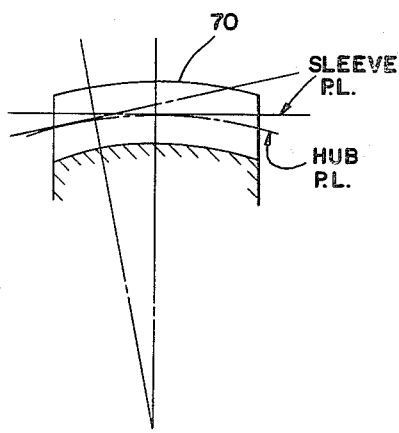
Figure 8:
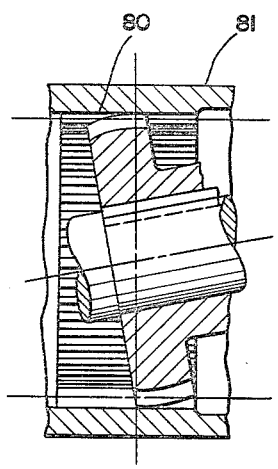
Figure 6:
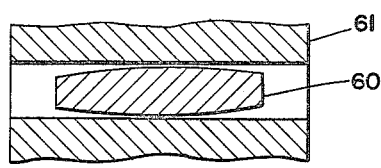

FIGURES 3 and 4 in diagrammatic perspective and profile are representative of the preferred tooth design of both the sleeve and hub teeth;

FIGURES 5 and 6 are sectional representative views of the hub and sleeve tooth relationship; and FIGURES 7 and 8 are further representations, in section, of the sleeve and hub tooth flexibility of adjustment.

Figure 1:
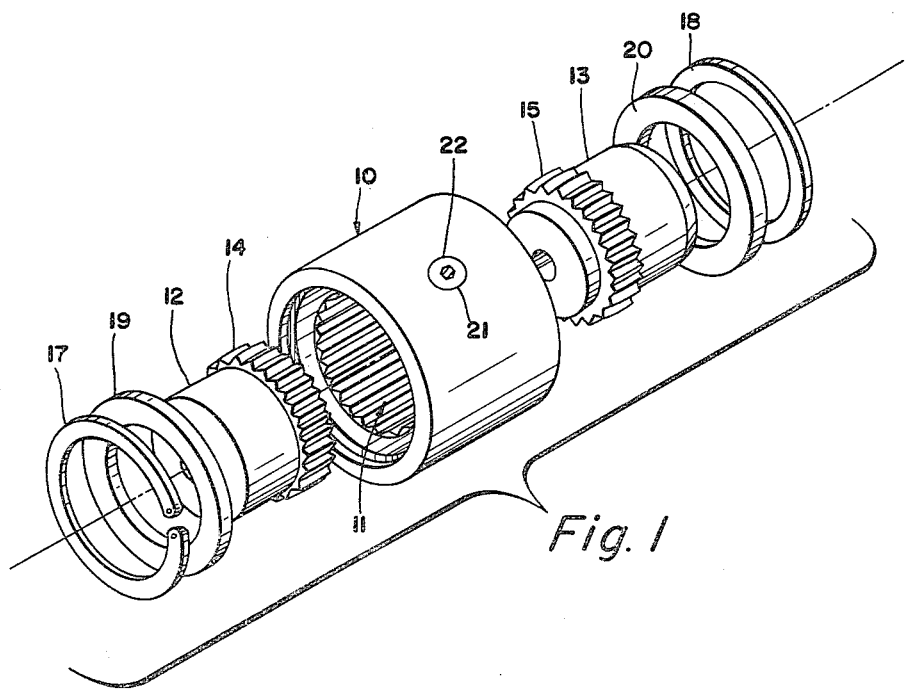
FIGURE 1 is an exploded isometric showing the elements comprising the coupling of this invention.

The coupling of FIGURE 1 of the drawing is basically formed of three essential parts, a sleeve 10 with internal gear teeth 11 and two hub members 12, 13 with external teeth 14, 15, respectively. The sleeve 10 is held in place against lateral displacement by such means as end spring rings 17, 18, or by other retaining means, abutting the geared section of the hubs through, desirably, packing seals 19, 20, which may also serve as lubricant seals, the lubricant being injected through the sleeve entry 21 kept closed by a plug 22. The hubs 12, 13 can be connected to opposing shaft ends (not shown) by any desirable means such as by set screws or splined, the unit being assembled with internal hub end clearance before being placed into operation.

Figure 2:
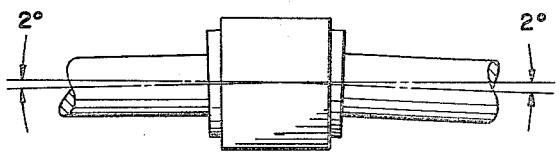
FIGURE 2 is a view representative of the coupling showing its adaptability to a high degree of misalignment of connecting shafts.

The assembled coupling is capable of transmitting torque or power with high efficiency under misalignments of up to a total of 4° or more as shown in FIGURE 2. It is capable of self-centering, the sleeve being adapted to adjust itself on the hubs within allowable lateral limits.

The self-centering ability of the sleeve and the flexibility of the coupling unit to the high degree of misalignment mentioned is a characteristic of the tooth construction of both the sleeve and the hub members. Upon study and experimentation of various designs, it has been found that a straight, flat-sided tooth in the sleeve and a spherically shaped, involute cut hub gear tooth designed to have a pressure angle in range from about 38° to 42° produce a coupling unit that is additionally rugged and efficiently useful for longer periods than many other types. A tooth having a pressure angle within the given range transmits very nearly all loading pressure through its base into the hub or into the sleeve body rather than solely through the tooth alone. In this range, it has been found that the 40° pressure angle is most desirable. At that pressure angle value, the unit pressure at point of contact is significantly lower because of a larger radius of curvature of the tooth surface, the load being transmitted substantially within the tooth base area into the hub or the sleeve body and, advantageously, at the common pitch circle of the hubs and sleeve.

By way of example and as shown in FIGURES 3 and 4, an external, spherical, hub tooth 30, involute cut, and having a 40° pressure angle is positioned between opposite flat faces of continuous, straight, flat face-sleeve teeth 31, 32.

There is also, advantageously, an increased contact area between the sleeve and hub gears because of the flat faces of the sleeve teeth and the 40° pressure angle construction giving a large based tooth. Also, there is no bottoming of teeth of either set, nor any shaving of tooth tips, or of their tip loading during rotation of the coupling unit. This is obvious from FIGURES 5 and 6. The continuous flat teeth 51 of the sleeve 50 rest in substantial contact with the curved sides of the involute formed hub gear teeth 52. The increased width of the teeth because of the 40° pressure angle resulting in a flatter involute curve prevents tooth bottoming and, also, results in the sleeve resting or floating at all times on the curved sides of the hub gear teeth permitting a quick readjustment of position thereon. Since the hub gears 60 of FIGURE 6, 70 to FIGURE 7 and 80 of FIGURE 8 are spherically cut and involute formed [FIGURES 6 (section on line 8—8 of FIGURE 5), 7 and 8], and being curved, they become readily adjustable to transverse or longitudinal misalignment of the connected shafts. Within the limits of permissible maximum misalignment, the gear hubs readjust themselves without binding in the sleeve 61 or 81, and maintain substantial pitch circle contact to give a smooth, efficient, and generally maximum torque output.

What is claimed is:

1. A gear coupling comprising, an internally toothed sleeve and a pair of externally toothed hub members adapted to be positioned therein in apposition and in intermeshing tooth contact, the sleeve member having flat-sided teeth and extending lengthwise, the hub members having involute cut teeth, all teeth being so cut as to have a pressure angle of about 40° at about the pitch circle, the angle being the smaller angle formed by the intersection, at the point of tangency, of the line tangent to the pitch circle and the line of action.

2. The gear coupling of claim 1 where the hub member teeth are involute and spherically cut.

3. The gear coupling of claim 1 where the flat-sided sleeve member teeth are continuous and the hub member teeth are involute and spherically cut.

References Cited by the Examiner
UNITED STATES PATENTS

| | | | |
|---|---|---|---|
| 1,891,285 | 12/32 | Loewus | 64—9 |
| 2,510,414 | 6/50 | Philbrick | 64—9 |
| 2,682,760 | 7/54 | Shenk | 64—9 |
| 2,687,025 | 8/54 | Wildhaber | 64—9 |
| 2,841,966 | 7/58 | Belden et al. | 64—9 |
| 2,922,294 | 1/60 | Wildhaber | 64—9 |

ROBERT C. RIORDON, *Primary Examiner.*

KARL J. ALBRECHT, *Examiner.*